May 1, 1934. A. MAURER 1,957,028
MACHINE TOOL FOR GENERATING THE TEETH OF BEVEL GEARS
Filed Aug. 10, 1932 7 Sheets-Sheet 4

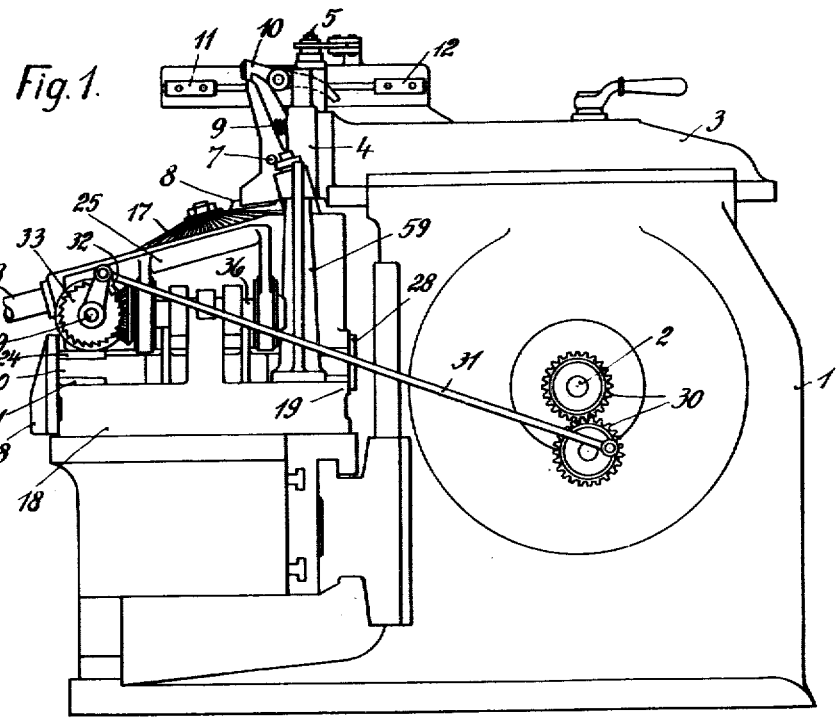

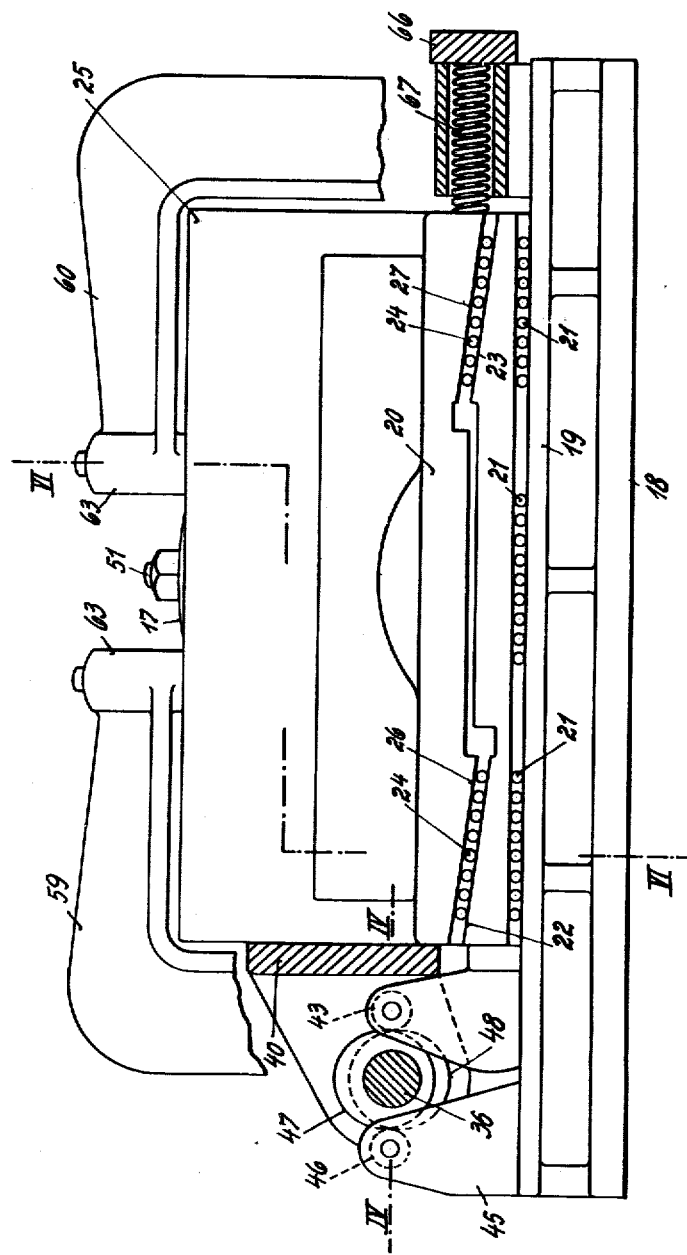

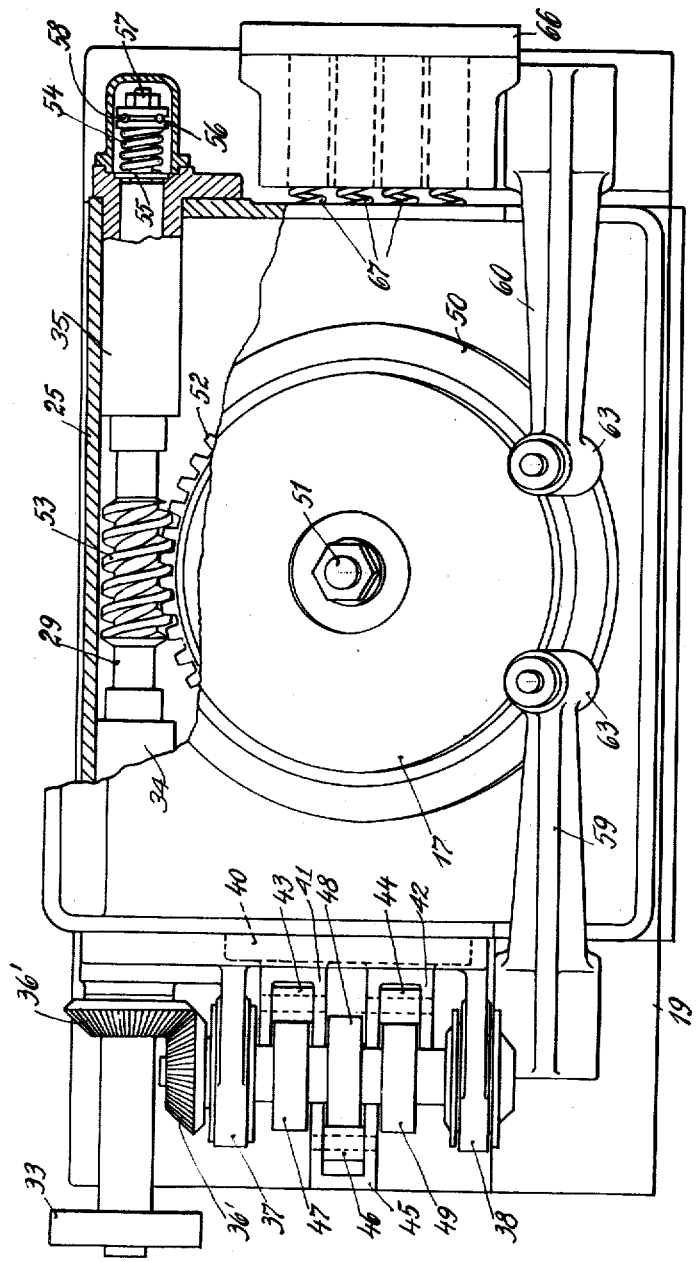

Inventor:
Albrecht Maurer
by Karl Michaelis
Atty.

Inventor:
Albrecht Maurer

Inventor:
Albrecht Maurer
by Karl Michaelis,
Atty.

Patented May 1, 1934

1,957,028

UNITED STATES PATENT OFFICE 1,957,028

MACHINE TOOL FOR GENERATING THE TEETH OF BEVEL GEARS

Albrecht Maürer, Bad Homburg vor der Hohe, Germany

Application August 10, 1932, Serial No. 628,157
In Germany August 13, 1931

7 Claims. (Cl. 90—9)

My invention relates to a machine tool for generating the teeth of bevel gears. It is an object of my invention to provide an improved machine tool of the type referred to. To this end, in combination with a cutting tool, I provide a chuck for the gear in which the teeth are to be generated, and means for imparting to the tool and the gear relative rotation, relative displacement in parallel relation to an axial plane of the gear, and displacement transversely to the cutting direction, during the operation of the cutting tool.

By way of example a machine tool will be described by which teeth are generated in bevel gears or cone pulleys for a change-speed gear having two pairs of bevel gears or cone pulleys, and a chain adapted to engage in the notches of the bevel gears or cone pulleys. By shifting axially the cone pulleys, the ratio of the gear is varied.

In a bevel gear or cone pulley of this kind the length of the teeth in radial direction is considerable and therefore the notches are much wider at their outer than at their inner ends. It would be difficult to generate teeth with such notches by the old methods but according to my invention and by the three relative displacements set out above, these difficulties are overcome.

In the machine tool which will be described by way of example, the carriage with the tool head is reciprocated as in a planer, the chuck with the gear is raised and lowered with respect to the tool, and the gear is indexed by rotating it about its axis, but it is understood that I am not limited to this particular way of performing the three relative displacements. For instance, I might raise and lower the tool with respect to the gear, or vary the relative displacement in any other way, without departing from my invention. The only important point is that three relative displacements are performed.

The relative displacements may be combined in various ways. Four stages will be distinguished, as follows: First stage: Penetration of the cutting tool into the gear until the tooth flank at one side of the notch has been finished; second stage: Finishing the notch as far as the tooth flank at its opposite side; third stage: Disengaging the gear and the cutting tool; fourth stage: Presenting the gear to the tool, or the tool to the gear, as the case may be, in position for tooling the first flank of the next notch.

During the second and fourth stages, the relative displacement of the tool and the gear is a combined rotation and a displacement transversely to the cutting direction. The transverse displacement during the fourth stage is opposite to the transverse displacement during the second stage. The relative displacement during the first and third stages may be modified. Thus, the displacement during the first stage, i. e., until the flank at one side of the notch has been generated, may be only vertical and the gear is only raised during the first stage and only lowered during the third stage, without being moved otherwise. On the other hand, it is also possible to displace the gear transversely during the first stage and to raise it at the same time until the first flank has been tooled, and to perform corresponding movements in opposite directions during the third stage, while at the same time the gear is rotated. Another possibility is to combine all three displacements during the first and third stages, i. e., rotating and transversely displacing the gear while raising or lowering it. In this case the rotation may be uniform during the entire period required for generating a notch.

If it is desired that the faces of the teeth should be arched the tool and the gear are displaced in parallel to the axis of the gear with respect to each other.

In the drawings affixed to this specification and forming part thereof a machine tool embodying my invention, a bevel gear to be generated by the tool, and various stages of its operation, are illustrated diagrammatically by way of example.

In the drawings

Fig. 1 is an elevation of the machine tool,

Fig. 2 is a plan view showing the mechanism for vertically displacing the tool holder if it is desired to arch the faces of the teeth, Fig. 3 is a side elevation of the indexing mechanism, Fig. 4 is a plan view, partly in section on the line IV—IV in Fig. 3.

Figure 5:
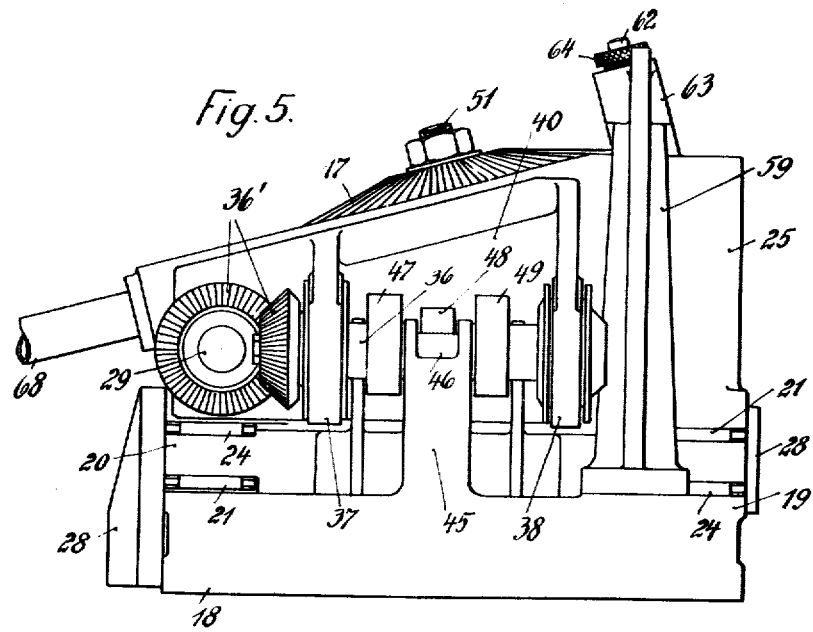
Fig. 5 is an end elevation of the mechanism.
Figure 6:
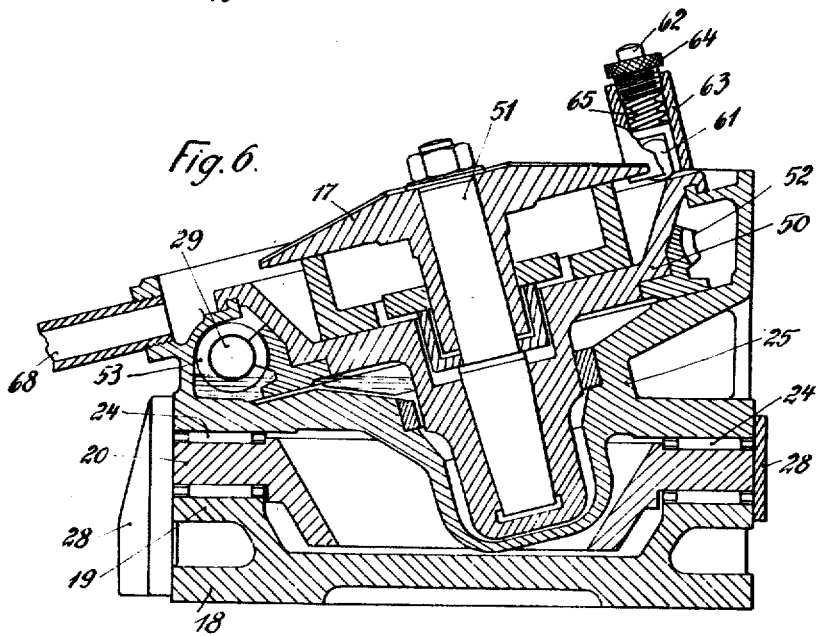
Fig. 6 is a section on the line VI—VI in Fig. 3.
Figure 7:
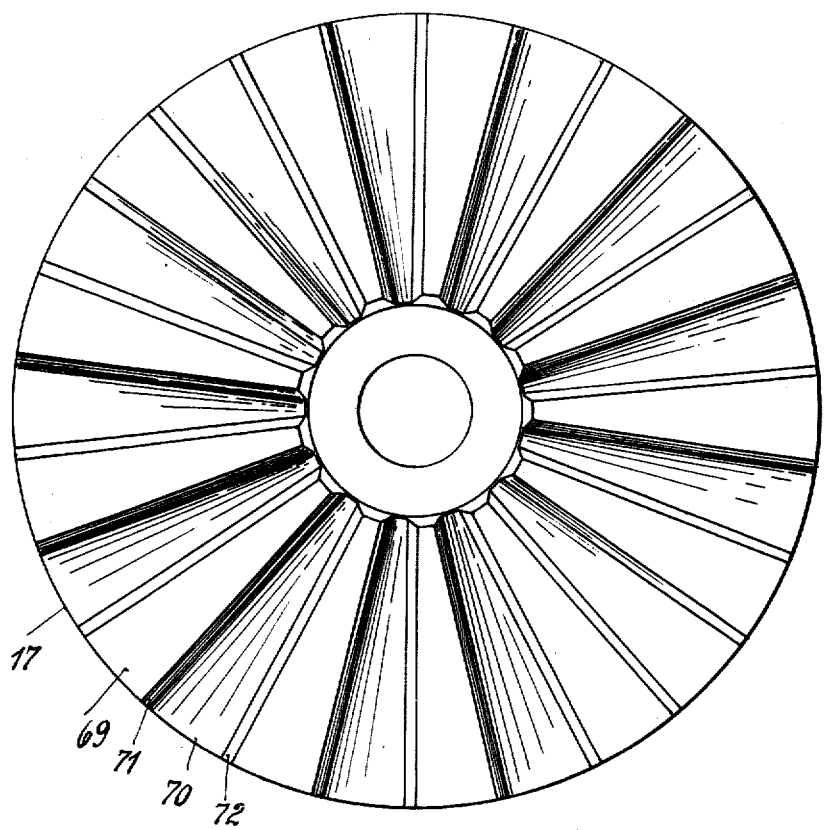
Fig. 7 is a plan view of a finished bevel gear or cone pulley for the change-speed gear referred to, and Figs. 8 to 14 illustrate various stages in the operation of the machine.

Referring now to the drawings, and first to Figs. 1 to 6, 1 is the frame of the planing machine, 2 is its driving shaft and 3 is its carriage. 4 is the tool head which is mounted for vertical reciprocation on a threaded spindle 5, 6 is a tool holder which is mounted to rock about a pin 7 on the tool head and supports a cutting tool 8, 9 is a spring which is inserted between the tool head 4 and the tool holder 6, 10 is a catch for engaging the upper end of the tool holder 6 for holding the tool 8 in inactive position, and 11 and 12 are dogs for controlling the catch 10.

13, Fig. 2, is a shaft at one side of the carriage 3, 14 is an arm on the shaft, and 15 is a lever on the spindle 5 whose free end is engaged by a pin 16 at the free end of the arm 14. When the carriage 3 reciprocates, rocking movement is imparted to the arm 14 and to the lever 15 which causes the spindle 5 to rotate and the tool head 4 to move in parallel to the axis of the spindle for raising and lowering the tool 8.

The mechanism for controlling the movement of the gear 17 with respect to the tool is mounted on a bed-plate 18 forming part of the frame 1. It is equipped with a foundation plate 19, on which is mounted a slide 20. Antifriction means such as rollers or balls 21 are inserted between the horizontal upper face of the foundation plate 19 and the horizontal lower face of the slide 20. The slide 20 has inclined faces 22 and 23 at its front and rear ends on which are placed antifriction means 24. 25 is a casing which has inclined faces 26 and 27 at its front and rear ends, respectively, which extend in parallel to the faces 22 and 23 and bear on the antifriction means 24 of the respective faces. 28, 28 are side plates for holding the slide 20 in line with the foundation plate 18.

29 is the driving shaft of the mechanism to which intermittent movement is imparted by gearing 30 operatively connected to the shaft 2, a connecting rod 31, a pawl 32 and a ratchet wheel 33. The driving shaft 29 is mounted to rotate in suitable bearings 34 and 35 in the casing 25. 36 is a cam shaft which is mounted to rotate in bearings 37 and 38 of a bracket 39 which is secured to the front wall of the casing 25. 36' is a bevel gearing connecting the shafts 29 and 36. The bearing 34 for the driving shaft 29 may be cast integral with the bracket 39. 40 is a plate which may be integral with the bracket 39 and is also secured to the front wall of the casing 25. The plate 40 has bearings 41 and 42 in which rollers 43 and 44, respectively, are mounted to rotate. 45 is a bearing on the base plate 19 in which is mounted to rotate a roller 46, 47, 48 and 49 are cams which cooperate respectively with the rollers 43, 44 and 46.

Mounted to rotate in the casing 25 is a chuck 50 with a spindle 51 for holding the gear 17. The chuck will not be described in detail. 52 is a worm wheel on the chuck 50 and 53 is a worm on the driving shaft which meshes with the worm wheel 52 so that intermittent rotation is imparted to the chuck 50 as the driving shaft 29 is intermittently rotated by the pawl 32 and the ratchet wheel 33. The rear end of the shaft 29 is equipped with a spring 54 which is mounted on the reduced end of the shaft and bears on a washer 55 at the rear end of the bearing 35. The rear end of the spring is abutted against a washer 56 and a nut 57 is seated on the threaded rear end of the reduced portion, antifriction means 58 being inserted between the two washers. The tension of the spring 54 is regulated by these means.

59 and 60 are two uprights on the foundation plate 19. Each upright at its inner end is equipped with a roller 61 which bears on the chuck 50, Fig. 6. Each roller 61 is mounted at the end of a spindle 62 which is adapted to be displaced in the head 63 of the corresponding upright. 64 is a sleeve which is secured on the spindle and, with a threaded portion, engages a thread in the head 63. 65 is a spring which is inserted between the sleeve 64 and a shoulder on the spindle, so that the roller 61 is applied to the chuck 50 under resilient pressure.

Secured on the rear end of the base plate 18 is a buffer bracket 66 with springs 67 therein whose front ends bear on the rear end of the casing 25.

The cavity of the casing 25 is filled with a lubricant in which the worm 53 rotates so that the worm gear is continuously and amply lubricated. Cooling medium is applied to the gear 17 by suitable means, not shown, and discharged through a pipe 68.

The operation of my machine tool is as follows:

One side of the gear 17 is presented to the tool 8 in a position which is parallel to the reciprocation of the tool, and the cooling medium is applied to this side. The chuck 50 is rotated intermittently and through equal angles by the driving shaft 29, and a corresponding rotation is imparted to the chuck 50 through the worm wheel 52. The cam shaft 36 is rotated by the driving shaft 29. If an elevated portion of cam 48 registers with the roller 46 which is mounted in the bearing 45 on the base plate 18 as described, the casing 25 with the shafts 29 and 36 is moved to the rear. This movement is transmitted to the slide 20 through the medium of cams 47 and 49, and the rollers 43 and 44. The slide 20 and the casing 25 are displaced through the same distance together so that the casing 25 is only displaced transversely to the cutting direction of the tool 8, but neither raised nor lowered. If a lower portion of cam 48 engages with the roller 46, the casing 25 and the slide 20 are returned together to their initial positions by the springs 67.

The cams 47 and 49 rotate with the cam 48 and, according to their configuration, may effect a relative movement of the slide 20 and the casing 25. If the slide 20 moves to the right in Fig. 3, the casing 25 is raised, and if the slide is moved in the opposite direction, the casing is lowered. Obviously, any desired combination of movements transversely to the cutting direction and in parallel relation to one of the axial planes of the gear 17, (the axis of the gear is inclined in the example illustrated and the movement in parallel to the selected axial plane is vertical) may be obtained by suitably designing and arranging the cams 47, 48 and 49 with respect to each other. Preferably, the cam shaft 36 and the driving shaft 29 are so connected that a complete revolution of the cam shaft 36 corresponds to the rotation of the gear 17 through one pitch of the gear teeth.

Referring now to Figs. 7 and 9 to 13, 69 is one of the teeth and 70 is one of the notches in the gear 17 whose teeth are generated on the machine tool. 71 is one of the flanks, which for the sake of convenience will be referred to as "the first flank", and 72 is the "second" flank at the opposite side of the notch.

Figure 8:
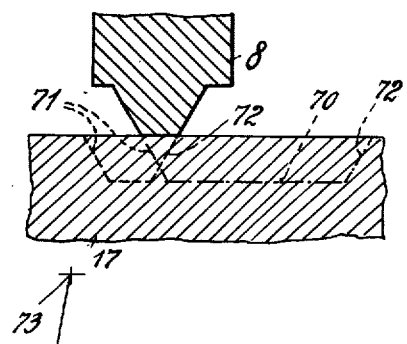
Figure 9:
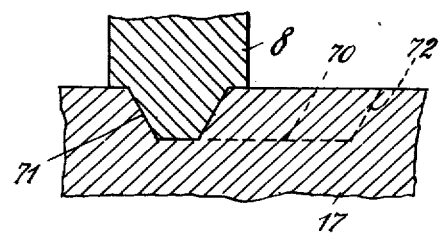
Figure 8A:
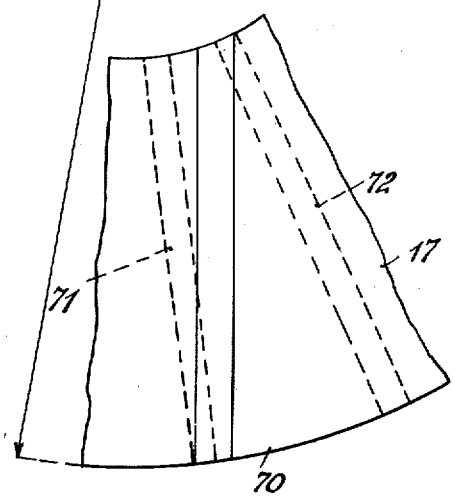
Figure 10:
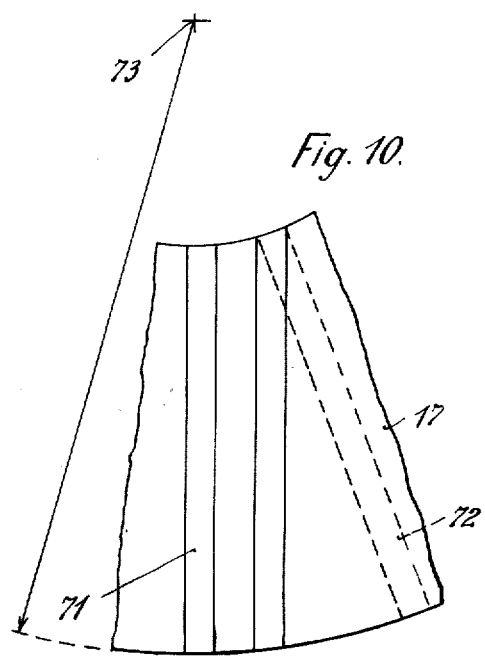
Figure 11:
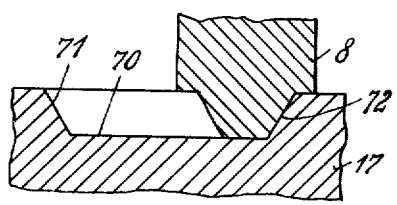
Figure 13:
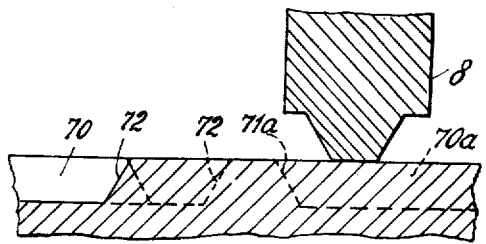
Figure 12:
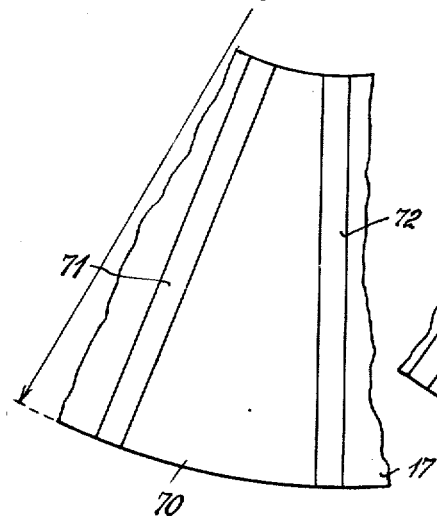
Figure 14:
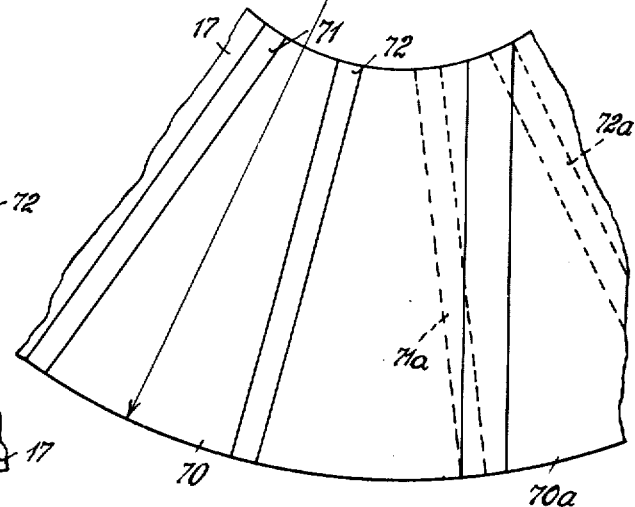

Referring now to Fig. 8, this shows the tool 8 in its initial position at the inner end of the notch 70 which is shown in dotted lines, with its flanks 71 and 72. The gear 17 is raised, rotated and displaced transversely to the cutting direction during the first stage, as described, and Fig. 9 shows the relative position of the tool and the gear after the first flank 71 has been finished, the axis about which the gear rotates being indicated at 73 in Fig. 10. Fig. 11 shows the relative position of the tool and the gear after the second flank 72 has been finished and the notch completed. Figs. 13 and 14 show the tool 8 in position for beginning on the first flank 71a of the next notch 70a.

If it is desired that the teeth 69 should be arched, the spindle 5 is rotated by the mechanism illustrated in Fig. 2 while the tool moves from one flank to the other so that the tool is raised and lowered and the face of the tooth is arched.

As mentioned, the operation of my machine tool may be modified in various ways. For instance, the gear may not be rotated during the finishing of the first flank 71, Figs. 8 and 9, but only raised and displaced at right angles to the cutting direction. It is also possible not to rotate and to displace the gear during the first stage, but only to raise it. Corresponding movements are performed during the third stage.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In a machine tool for generating gear teeth, a cutting tool, a chuck for the gear, means for rotating said chuck, a cam, means for rotating said cam, a wedge member adapted to be displaced by said cam, means connected to said member for raising and lowering said chuck, and means for displacing said chuck transversely to the cutting direction.

2. In a machine tool for generating gear teeth, a cutting tool, a chuck for the gear, means for rotating said chuck, a set of cams, means for rotating said cams, a wedge member adapted to be displaced by one of said cams, means connected to said member for raising and lowering said chuck, and means operatively connected to the other cams of the set for displacing said chuck transversely to the cutting direction.

3. In a machine tool for generating gear teeth, a cutting tool, a chuck for the gear, means for rotating said chuck, a cam, means operatively connected to said chuck-rotating means for rotating said cam, a wedge member adapted to be displaced by said cam, means connected to said member for raising and lowering said chuck, and means for displacing said chuck transversely to the cutting direction.

4. In a machine tool for generating gear teeth, a cutting tool, a chuck for the gear, means for rotating said chuck, a set of cams, means operatively connected to said chuck-rotating means for rotating said cams, a wedge member adapted to be displaced by one of said cams, means connected to said member for raising and lowering said chuck, and means operatively connected to the other cams of the set for displacing said chuck transversely to the cutting direction.

5. In a machine tool for generating gear teeth, a cutting tool, means for reciprocating said cutting tool, a chuck for the gear, a casing for the reception of said chuck, means on said casing for rotating said chuck, an inclined face on said casing, a slide having a corresponding inclined face for the face of said casing to bear on, means for displacing said slide, and means for displacing said casing with respect to said slide.

6. In a machine tool for generating bevel gear teeth, a carriage, a cutting tool mounted to be displaced on said carriage, a threaded spindle operatively connected to said cutting tool, means adapted to be operated by the reciprocation of said carriage for rotating said spindle, a chuck for the gear, and means for imparting to said tool and said chuck relative rotation, relative displacement in parallel relation to an axial plane of said gear, and relative displacement transversely to the cutting direction.

7. In a machine tool for generating gear teeth, a cutting tool, a chuck for the gear, means for rotating said chuck, a cam, means for rotating said cam, a member which is adapted to be displaced by said cam and to raise and to lower said chuck, means connected to said member for raising and lowering said chuck, and means for displacing said chuck transversely to the cutting direction.

ALBRECHT MAÜRER.

Certificate of Correction

Patent No. 1,957,028.   May 1, 1934.

It is hereby certified that the name of the inventor, and his residence, in the grant of the above numbered patent was erroneously written and printed as "Albrech Maürer, of Bad Homburg vor der Hohe, Germany" whereas said name should have been written and printed as *Albrecht Maurer, of Bad Homburg vor der Höhe, Germany*; in the heading to drawings, printed specification, and signature for "Maürer" read *Maurer*; and in line 4 of heading to printed specification, for "Hohe" read *Höhe*; and that the said Letters Patent should be read with these corrections therein that the same may conform to the record of the case in the Patent Office.

Signed and sealed this 24th day of July, A. D. 1934.

[SEAL]   BRYAN M. BATTEY,
*Acting Commissioner of Patents.* pleted. Figs. 13 and 14 show the tool 8 in position for beginning on the first flank 71a of the next notch 70a.

If it is desired that the teeth 69 should be arched, the spindle 5 is rotated by the mechanism illustrated in Fig. 2 while the tool moves from one flank to the other so that the tool is raised and lowered and the face of the tooth is arched.

As mentioned, the operation of my machine tool may be modified in various ways. For instance, the gear may not be rotated during the finishing of the first flank 71, Figs. 8 and 9, but only raised and displaced at right angles to the cutting direction. It is also possible not to rotate and to displace the gear during the first stage, but only to raise it. Corresponding movements are performed during the third stage.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In a machine tool for generating gear teeth, a cutting tool, a chuck for the gear, means for rotating said chuck, a cam, means for rotating said cam, a wedge member adapted to be displaced by said cam, means connected to said member for raising and lowering said chuck, and means for displacing said chuck transversely to the cutting direction.

2. In a machine tool for generating gear teeth, a cutting tool, a chuck for the gear, means for rotating said chuck, a set of cams, means for rotating said cams, a wedge member adapted to be displaced by one of said cams, means connected to said member for raising and lowering said chuck, and means operatively connected to the other cams of the set for displacing said chuck transversely to the cutting direction.

3. In a machine tool for generating gear teeth, a cutting tool, a chuck for the gear, means for rotating said chuck, a cam, means operatively connected to said chuck-rotating means for rotating said cam, a wedge member adapted to be displaced by said cam, means connected to said member for raising and lowering said chuck, and means for displacing said chuck transversely to the cutting direction.

4. In a machine tool for generating gear teeth, a cutting tool, a chuck for the gear, means for rotating said chuck, a set of cams, means operatively connected to said chuck-rotating means for rotating said cams, a wedge member adapted to be displaced by one of said cams, means connected to said member for raising and lowering said chuck, and means operatively connected to the other cams of the set for displacing said chuck transversely to the cutting direction.

5. In a machine tool for generating gear teeth, a cutting tool, means for reciprocating said cutting tool, a chuck for the gear, a casing for the reception of said chuck, means on said casing for rotating said chuck, an inclined face on said casing, a slide having a corresponding inclined face for the face of said casing to bear on, means for displacing said slide, and means for displacing said casing with respect to said slide.

6. In a machine tool for generating bevel gear teeth, a carriage, a cutting tool mounted to be displaced on said carriage, a threaded spindle operatively connected to said cutting tool, means adapted to be operated by the reciprocation of said carriage for rotating said spindle, a chuck for the gear, and means for imparting to said tool and said chuck relative rotation, relative displacement in parallel relation to an axial plane of said gear, and relative displacement transversely to the cutting direction.

7. In a machine tool for generating gear teeth, a cutting tool, a chuck for the gear, means for rotating said chuck, a cam, means for rotating said cam, a member which is adapted to be displaced by said cam and to raise and to lower said chuck, means connected to said member for raising and lowering said chuck, and means for displacing said chuck transversely to the cutting direction.

ALBRECHT MAÜRER.

Certificate of Correction

Patent No. 1,957,028.      May 1, 1934.

It is hereby certified that the name of the inventor, and his residence, in the grant of the above numbered patent was erroneously written and printed as "Albrech Maürer, of Bad Homburg vor der Hohe, Germany" whereas said name should have been written and printed as *Albrecht Maurer, of Bad Homburg vor der Höhe, Germany*; in the heading to drawings, printed specification, and signature for "Maürer" read *Maurer*; and in line 4 of heading to printed specification, for "Hohe" read *Höhe*; and that the said Letters Patent should be read with these corrections therein that the same may conform to the record of the case in the Patent Office.

Signed and sealed this 24th day of July, A. D. 1934.

[SEAL]

BRYAN M. BATTEY,
*Acting Commissioner of Patents.*